United States Patent
Clifford et al.

(10) Patent No.: US 9,938,020 B2
(45) Date of Patent: Apr. 10, 2018

(54) LASER-BASED TAIL DOCK ANTI-COLLISION SYSTEM AND METHOD TO PRECLUDE DAMAGE TO AIRCRAFT UPON THEIR INSERTION INTO MAINTENANCE FACILITIES

(71) Applicant: Laser Technology, Inc., Centennial, CO (US)

(72) Inventors: Bruce Clifford, Bolton (CA); Neil T. Heeke, Centennial, CO (US)

(73) Assignee: Laser Technology, Inc., Centennial, CO (US)

( * ) Notice: Subject to any disclaimer, the term of this patent is extended or adjusted under 35 U.S.C. 154(b) by 0 days.

(21) Appl. No.: 15/273,450

(22) Filed: Sep. 22, 2016

(65) Prior Publication Data

US 2017/0088287 A1    Mar. 30, 2017

Related U.S. Application Data

(60) Provisional application No. 62/234,516, filed on Sep. 29, 2015.

(51) Int. Cl.
*G05D 1/00* (2006.01)
*B64F 1/00* (2006.01)
*B64F 5/40* (2017.01)

(52) U.S. Cl.
CPC ............... *B64F 1/002* (2013.01); *B64F 5/40* (2017.01)

(58) Field of Classification Search
CPC .......... B64F 1/002; B64D 45/00; G08G 5/065
USPC ........ 701/3, 4, 5, 6, 7, 8, 10, 15, 16, 18, 24, 701/25, 26, 27, 38; 244/23 A, 23 B, 36, 244/211, 214, 215, 56, 179, 180, 181, 80, 244/90 R, 90 A; 340/963, 967–970, 973, 340/974, 975, 977, 978; 342/38, 63, 176, 342/357.2, 357.33, 357.36, 462; 703/9, 703/11, 12
See application file for complete search history.

(56) References Cited

U.S. PATENT DOCUMENTS

| | | | |
|---|---|---|---|
| 7,707,056 B1* | 4/2010 | Anbil | G06Q 10/08 705/7.12 |
| 7,734,493 B1* | 6/2010 | Anbil | G06Q 10/06312 705/7.22 |
| 8,700,438 B1* | 4/2014 | Heinold | G06Q 50/30 705/7.12 |
| 2015/0103458 A1* | 4/2015 | Liffring | H01F 38/14 361/93.1 |

* cited by examiner

*Primary Examiner* — Muhammad Shafi
(74) *Attorney, Agent, or Firm* — William J. Kubida; Hogan Lovells US LLP

(57) ABSTRACT

A tail dock anti-collision system for augmenting positioning of an aircraft in a maintenance facility which comprises lateral alignment sensors disposed on opposing sides of the aircraft and a backup tracking sensor directed toward the tail section. A processor, for example a programmable logic controller, is coupled to, and operatively controls, the sensors to provide an indication to a principal guide of the aircraft docking procedure of the relative position of the aircraft with respect to a centerline and platform of the maintenance facility.

11 Claims, 6 Drawing Sheets

Top plan view of an aircraft being inserted into a tail dock anti-collision facility having lateral alignment sensors, a backup tracking sensor, and a processor Top plan view of an aircraft being inserted into a tail dock anti-collision facility having lateral alignment sensors, a backup tracking sensor, and a processor AIRCRAFT IN PARKED POSITION WITH RESPECT TO A MAINTENANCE PLATFORM OF A TAIL DOCK FACILITY Elevational view of an aircraft empennage in a tail dock platform having opposing lateral alignment sensors and target boards Elevational view of an aircraft empennage in a tail dock platform with a wide beam pattern emitted by a backup tracking sensor Top plan view of an aircraft being inserted into a tail dock anti-collision facility having a backup tracking sensor

LASER-BASED TAIL DOCK ANTI-COLLISION SYSTEM AND METHOD TO PRECLUDE DAMAGE TO AIRCRAFT UPON THEIR INSERTION INTO MAINTENANCE FACILITIES

CROSS REFERENCE TO RELATED PATENT APPLICATIONS

The present invention is related to and claims priority from U.S. provisional patent application Ser. No. 62/234,516 filed Sep. 29, 2015, the disclosure of which is herein specifically incorporated by this reference in its entirety.

BACKGROUND OF THE INVENTION

The present invention relates, in general, to the field of aircraft maintenance hangar safety systems and methods. More particularly, the present invention relates to a laser-based tail dock anti-collision system and method to preclude or substantially eliminate damage to aircraft upon their insertion into maintenance bays or other facilities.

Statistically, somewhat over ninety percent (90%) of the damage which occurs during an aircraft's insertion into a tail dock facility is the result of the plane either being off of the centerline or being inserted too far into the tail dock. Other causes of damage to the plane generally relate to procedural issues such as the tail dock not being properly configured or unintended interaction with obstacles in the path of the plane prior to its insertion.

SUMMARY OF THE INVENTION

The laser-based tail dock anti-collision system and method of the present invention is directed toward drastically reducing or substantially eliminating damage to aircraft as they are inserted into a tail dock facility and serves to augment an aircraft maintenance facility's current procedures for guiding an airplane into a tail dock facility.

In a representative embodiment of the present invention disclosed herein the system may comprise a number of lateral alignment laser-based sensors utilized to establish how far the vertical stabilizer of the aircraft is from the tail dock centerline in conjunction with one or more backup tracking laser-based sensors to monitor the progress of the plane to the planned stopping point as it is inserted into the tail dock. The number of backup tracking sensors may vary in accordance with the height of the aircraft empennage.

In conjunction with the above-mentioned lateral alignment and backup tracking sensors operating in association with a central processing unit (CPU) system (hereinafter a "processor"), such as a programmable logic controller (PLC), an application program ("app") resident for example in a handheld tablet device, may also be provided to address procedural dock configuration and equipment clearance matters in the form of a checklist.

Each of the lateral alignment and backup tracking sensors provide input to the processor to process the information obtained and the processor is operative to determine if there is a warning or aircraft stop condition. Any warning or stop conditions may be ported to one or more locations including a control panel horn and/or light, the associated tug horn and/or light or the display of the principal guide tablet device.

If a stop condition is indicated, the aircraft must be stopped, extracted and re-inserted to the tail dock facility. The principal guide of the insertion process may be provided with a ruggedized tablet device running a customized app that indicates the progress of the plane in terms of distance to the stopping point and any centerline errors. The principal guide will verify that the dock is properly configured and prepared and the pathway cleared before the insertion process can commence. The tablet app can augment this through the use of checklist check boxes and the taking of appropriate pictures.

Particularly disclosed herein is a tail dock anti-collision system for augmenting positioning of an aircraft in a maintenance facility. The system comprises a plurality of lateral alignment sensors disposed on opposing sides of the aircraft and at least one backup tracking sensor directed toward the aircraft's tail section. A processor is provided in operative association with the lateral alignment and backup tracking sensors for providing an indication to a principal guide of the aircraft into the tail dock of the relative position of aircraft with respect to the centerline and platform of the maintenance facility.

Further particularly disclosed herein is a method for augmenting the positioning of an aircraft into a tail dock maintenance facility which comprises disposing lateral alignment sensors about a centerline of the maintenance facility to sense a position of the aircraft from the centerline as the aircraft is inserted therein. A backup tracking sensor is positioned at a distal end of the tail dock maintenance facility to sense a proximity of the aircraft to a desired stopping point within the tail dock maintenance facility. Data from the lateral alignment and backup tracking sensors is then provided to a processor.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
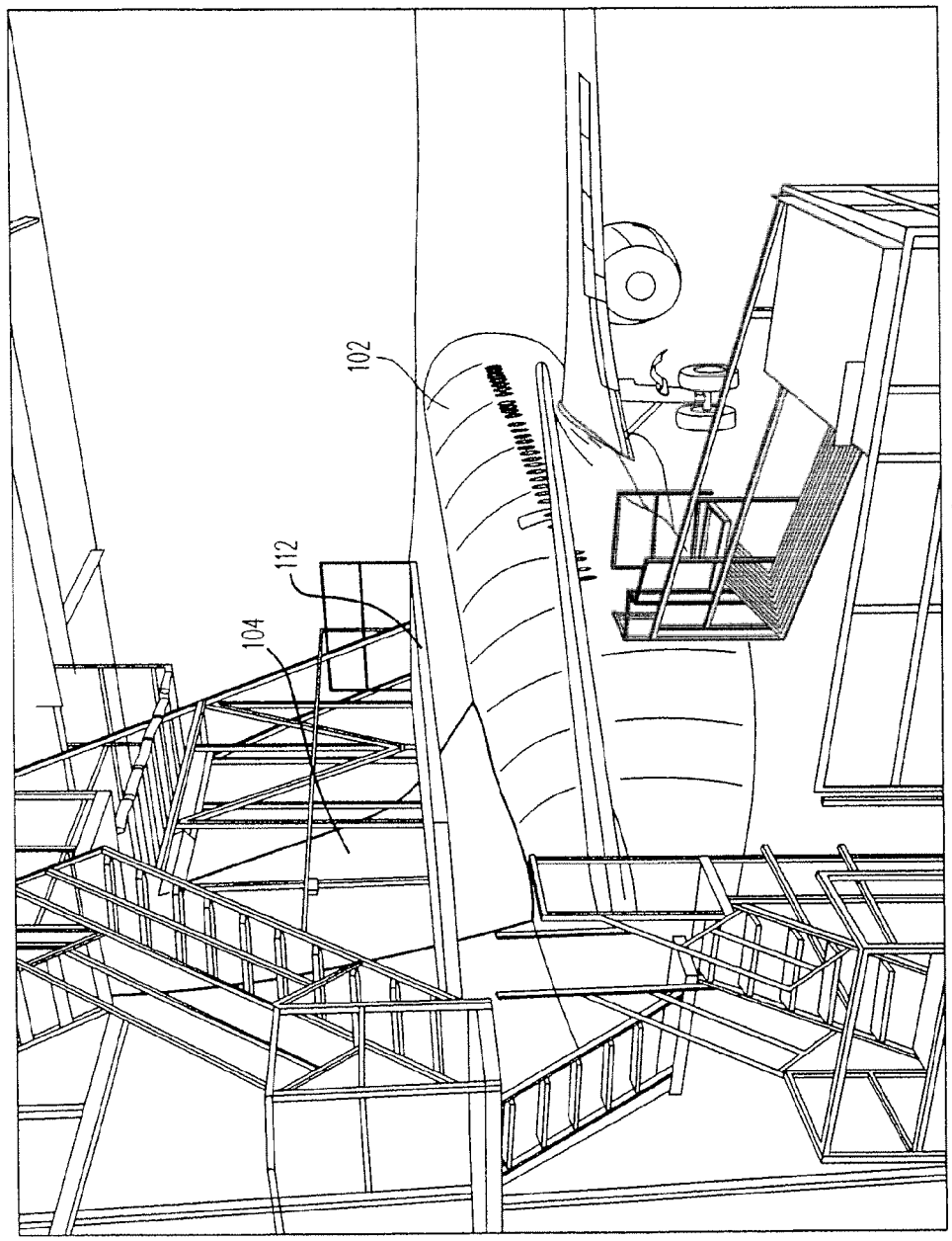
FIG. 1 is a perspective illustration of a representative tail dock facility for relatively narrow body aircraft.

With reference now to FIG. 1, a perspective illustration of a representative tail dock facility for relatively narrow body aircraft is shown.

Figure 2:
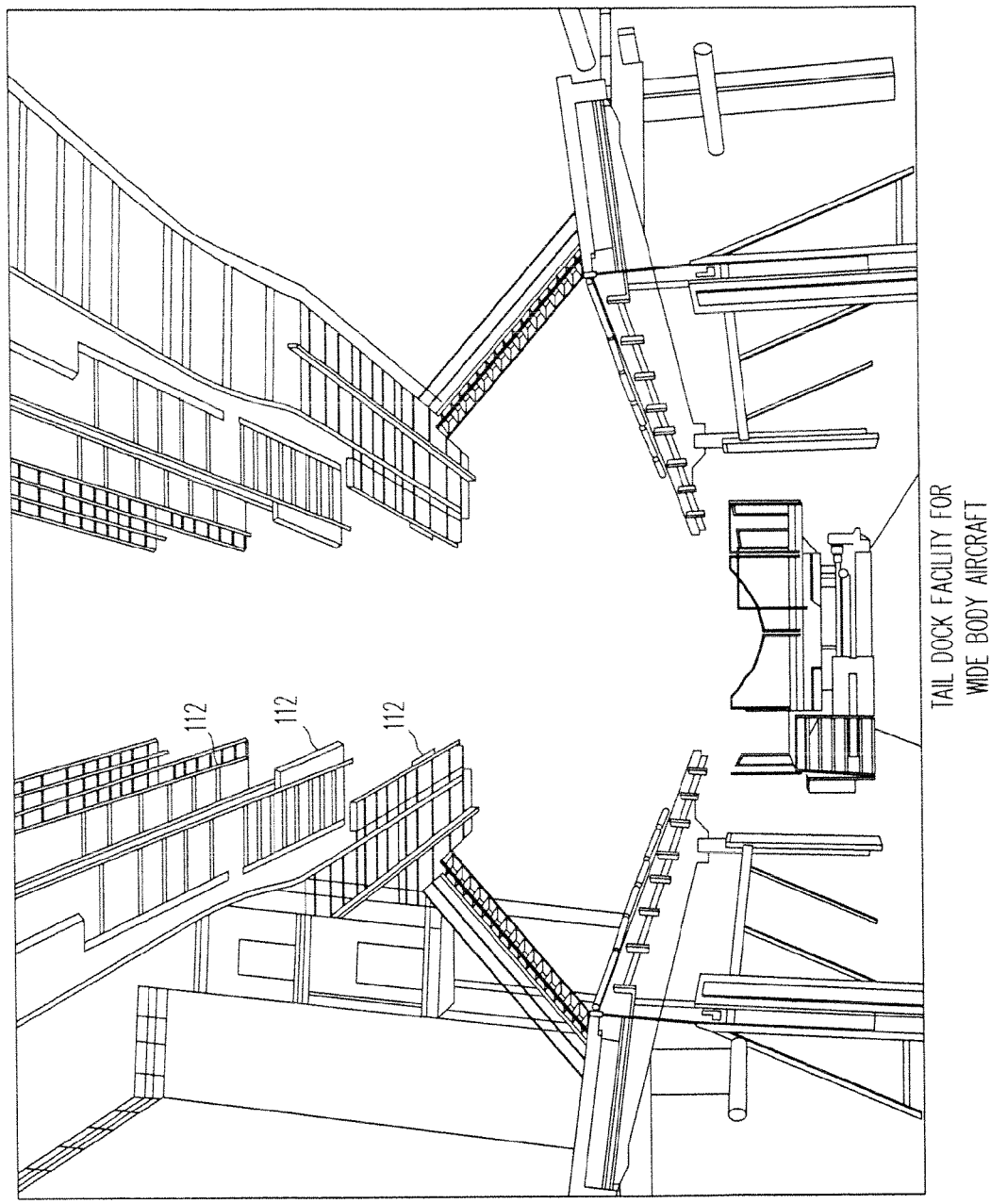
FIG. 2 is a head-on view of a representative tail dock facility for wide body aircraft illustrative of a number of maintenance platforms for adjoining an aircraft's empennage comprising its horizontal and vertical stabilizers.

With reference additionally now to FIG. 2, a head-on view of a representative tail dock facility for wide body aircraft is shown illustrative of a number of maintenance platforms for adjoining an aircraft's empennage comprising its horizontal and vertical stabilizers.

Figure 3:
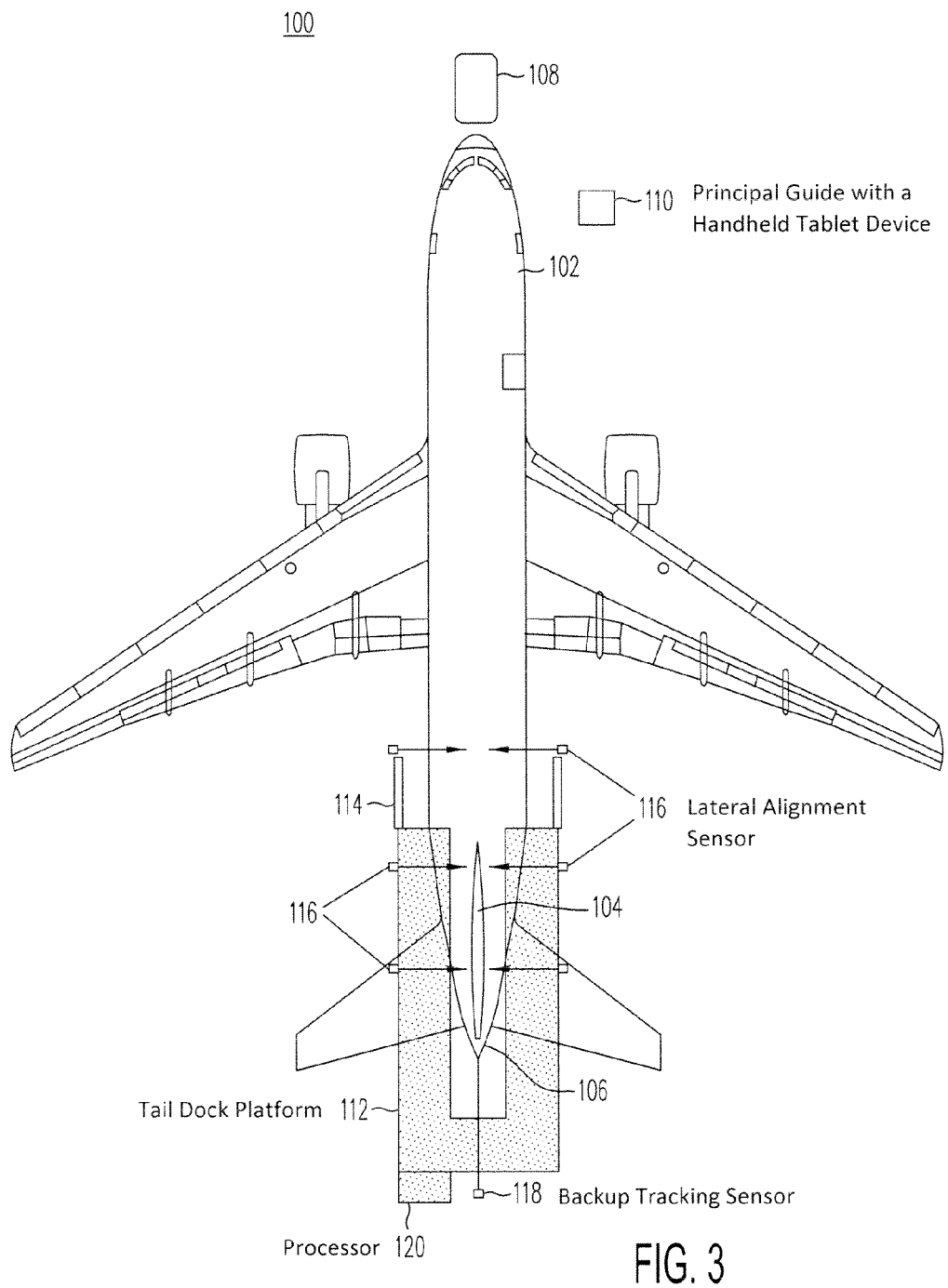
FIG. 3 is a top plan view of an aircraft having been inserted into a tail dock facility incorporating a laser-based tail dock anti-collision system in accordance with the present invention and illustrative of the position of the lateral alignment and backup tracking sensors in conjunction with the insertion tug, mobile tablet and processor cabinet.

With reference additionally now to FIG. 3, a top plan view of an aircraft having been inserted into a tail dock facility incorporating a laser-based tail dock anti-collision system 100 is shown. The system 100 is operative in conjunction with an aircraft 102 having a vertical stabilizer 104 and its aircraft tail section 106 as inserted into a tail dock facility by means of a tug 108. As will be more fully described hereinafter, the tug 108 may be advantageously equipped with a WiFi (IEEE 802.11x compliant) terminal and/or horn (auditory indication) and/or light (visual indication) module to provide information and/or warning messages to the tug 108 operator as appropriate.

In a tail docking operation, a principal guide 110 controls the process and may be equipped with a mobile tablet having a tail docking application (app) resident therein. The aircraft tail section 106 including the vertical stabilizer 104 (together with the horizontal stabilizer comprising the aircraft 102 empennage) must be correctly inserted along a centerline between the opposing portions of the tail dock platform 112 as shown without damage to the aircraft through collision with the tail dock platform or other obstructions in the tail dock facility.

In a representative embodiment of the present invention, the tail dock platform 112 may include extension bars 114 serving as additional mounting positions for the lateral alignment sensors 116 also affixed substantially as shown to the tail dock platform(s). One or more backup tracking sensors 118 are positioned to indicate the proximity of the aircraft tail section 106 as it is being inserted into the tail dock facility. A processor, for example a programmable logic controller (PLC) 120, operatively controls and receives inputs from the lateral alignment sensors 116 and backup tracking sensor(s) 118 and provides selected signals to the tug 108 and the principal guide 110 through the mobile tablet and app.

The lateral alignment and backup tracking sensors 116, 118 may comprise, for example, any of the TruSense™ series of laser sensors available from Laser Technology, Inc., Centennial, Colo., assignee of the present invention.

Figure 4:
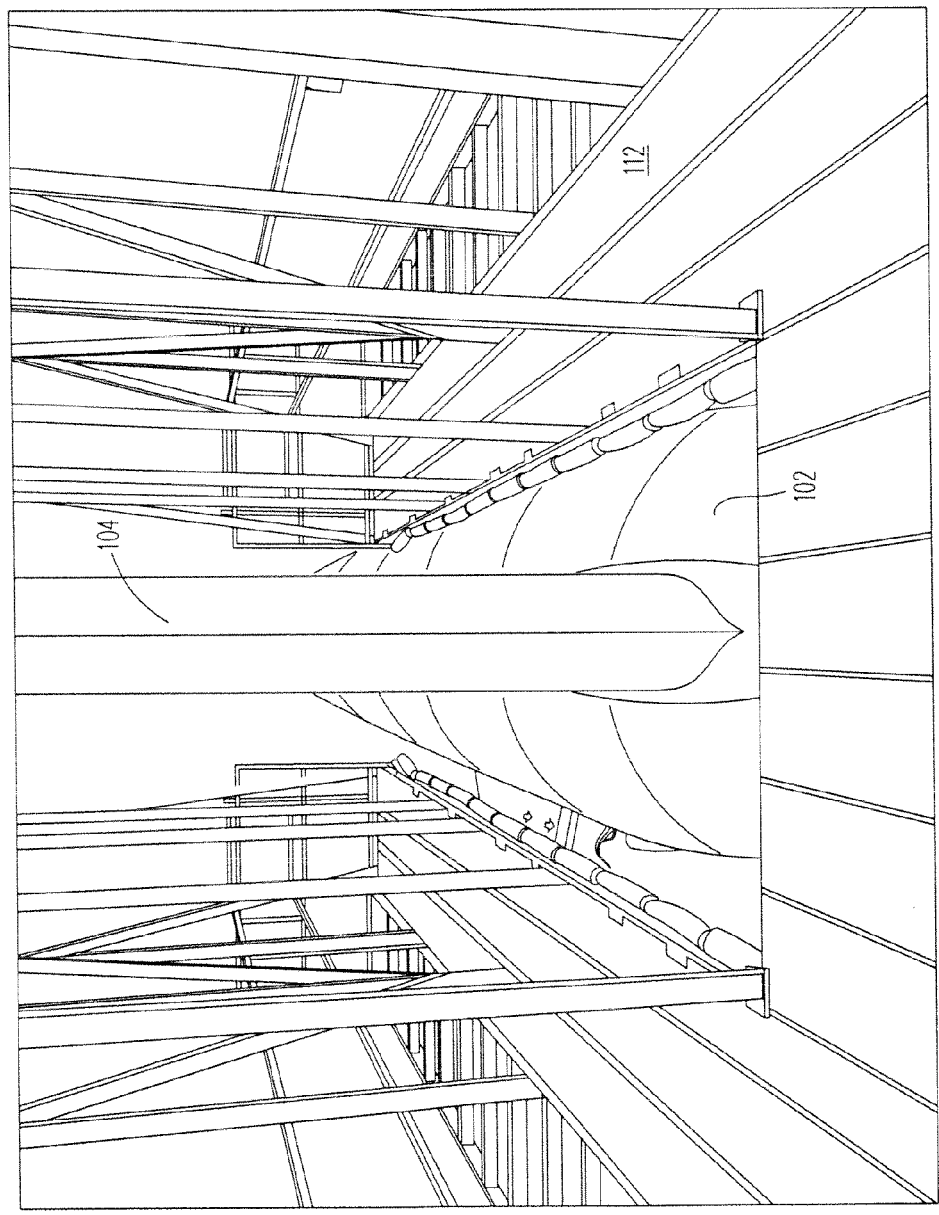
FIG. 4 is an illustration of the vertical stabilizer of an aircraft in a parked position with respect to a maintenance platform of a tail dock facility.

With reference additionally now to FIG. 4, an illustration of the vertical stabilizer of an aircraft in a parked position is shown with respect to a maintenance platform of a tail dock facility.

Figure 5:
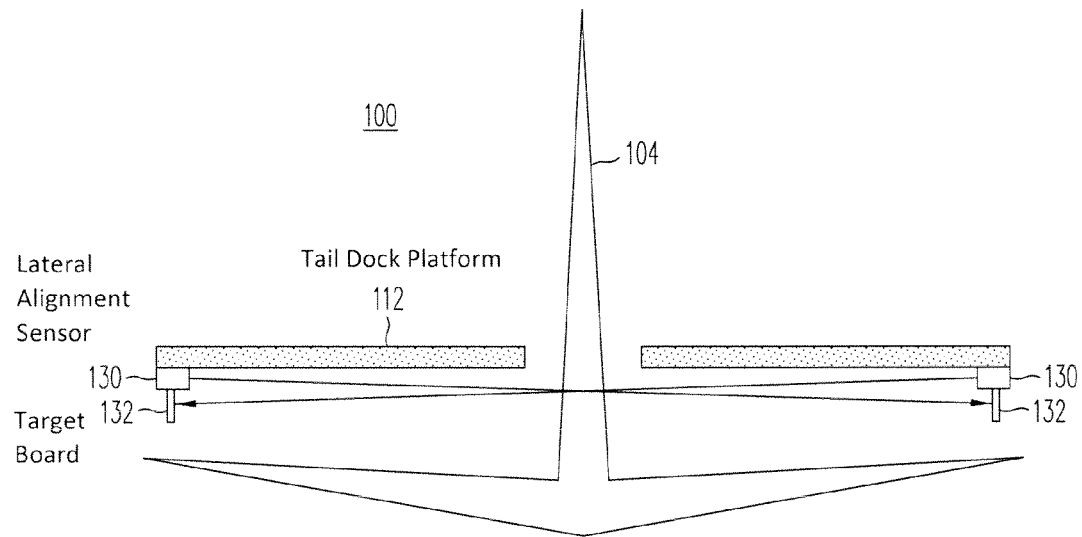
FIG. 5 is a simplified, schematic elevational view of an aircraft empennage illustrative of a possible configuration of opposing lateral alignment sensors and target boards of the present invention in relation to the vertical and horizontal stabilizers.

With reference additionally now to FIG. 5, a simplified, schematic elevational view of an aircraft empennage is shown in accordance with an embodiment of the laser-based tail dock anti-collision system 100 of the present invention illustrative of a possible configuration of opposing lateral alignment sensors 130 and target boards 132 of the present invention in relation to the vertical 104 and horizontal stabilizers and the tail dock platform 112.

The lateral alignment sensors 130 (such as the lateral alignment sensors 116 of FIG. 3) may comprise laser sensor pairs disposed in substantially the same horizontal plane aimed to a corresponding, small target board 132 mounted just below each opposing laser sensor. The target board 132 may be utilized to assist in the verification of the range and alignment of the lateral alignment sensors 130 during system startup and self-tests. As illustrated, the laser pairs may be installed under the tail dock platform(s) 112 and cabled to the associated PLC 120 (not shown). Further, it should be noted that each laser sensor device may be mounted to a two (2) axis pan and tilt bracket to facilitate its installation and alignment.

Figure 6:
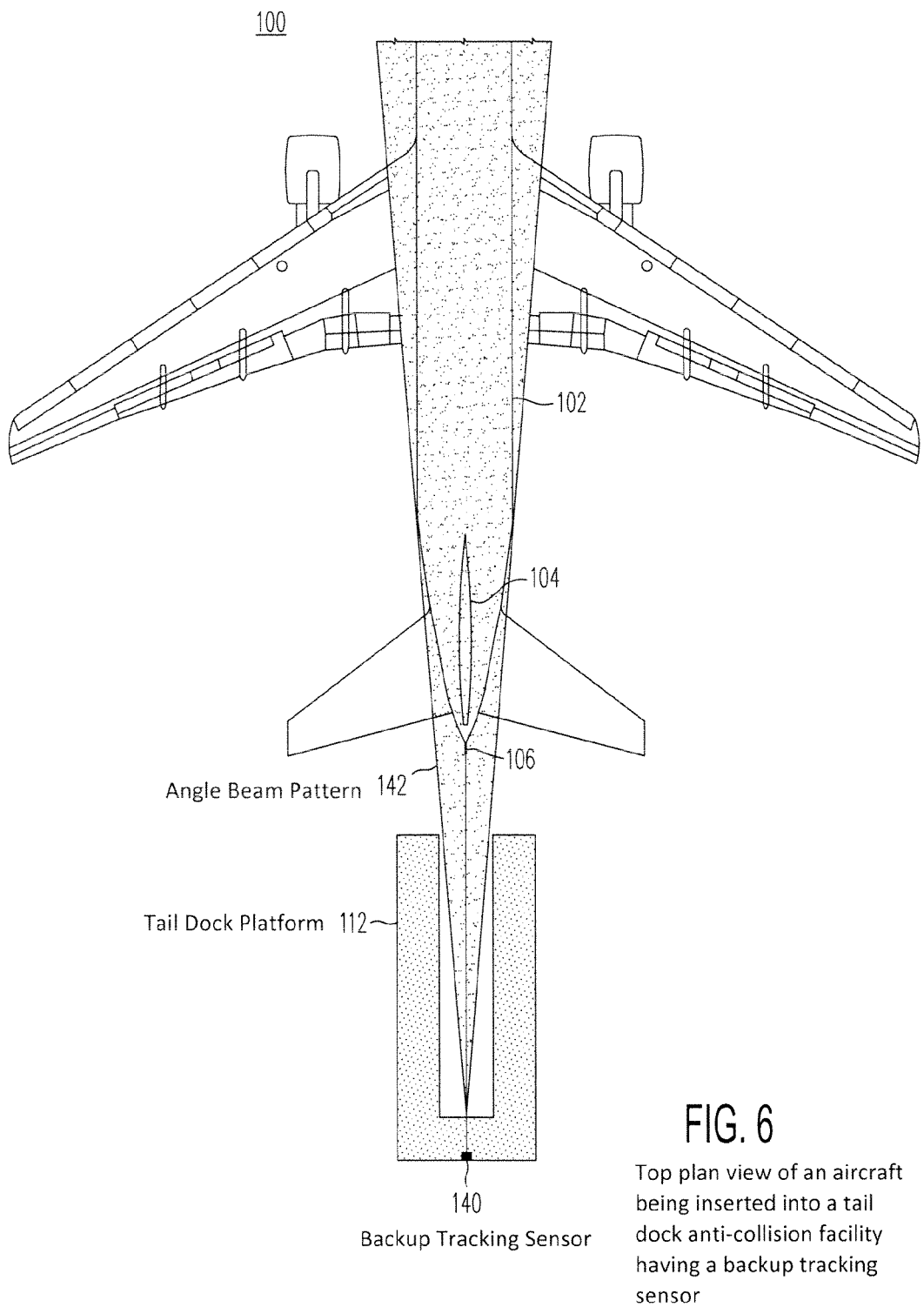
FIG. 6 is a simplified, schematic top plan view of a possible configuration of a backup tracking sensor directed toward the rear of an aircraft along a centerline and illustrative of the aircraft's progress towards insertion into a tail dock facility.

With reference additionally now to FIG. 6, a simplified, schematic top plan view of a possible configuration of an embodiment of the laser-based tail dock anti-collision system 100 of the present invention is shown illustrating a backup tracking sensor 140 (such as the backup tracking sensor 118 of FIG. 3) directed toward the rear of an aircraft 102 along a centerline is shown illustrative of the aircraft 102 progress towards insertion into a tail dock facility. In this figure the aircraft 102 tail section 106 and vertical stabilizer 104 are shown as such would approach the tail dock platform(s) 112. In this particular embodiment of the system 100 of the present invention, the backup tracking sensor 140 (such as the backup tracking sensor 118 of FIG. 3) emits a wide angle beam pattern 142 although other laser devices with other beam patterns may be utilized instead.

Figure 7:
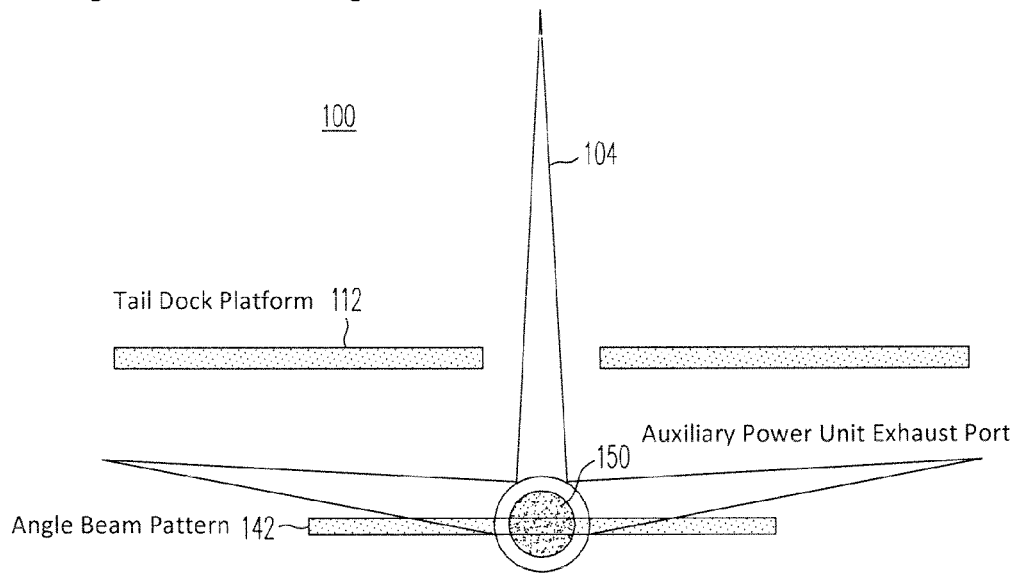
FIG. 7 is a further simplified, schematic elevational view of an aircraft empennage illustrative of a backup tracking sensor presenting a wide beam pattern across the auxiliary power unit (APU) exhaust port as well as the relative position of the horizontal and vertical stabilizers with respect to a tail dock platform.

With reference additionally now to FIG. 7, a further simplified, schematic elevational view of an aircraft empennage is shown illustrative of laser-based tail dock anti-collision system 100 in accordance with the present invention comprises a backup tracking sensor 140 (not shown) presenting a wide beam pattern 142 across the auxiliary power unit (APU) exhaust port 150 as well as the relative position of the horizontal stabilizer and vertical stabilizer 104 with respect to a tail dock platform 112.

The reference target for the backup tracking sensor(s) 140 may conveniently be the APU exhaust port 150 and separate laser devices may be required for each category of aircraft (e.g. 737-700, 737-800, 737-900 and the like) inserted in the tail dock facility. Since the APU exhaust port 150 will be essentially sensed as a void surrounded by a rim, a wide beam pattern laser may be used for the backup tracking sensor 140. The use of such a device will also allow the backup tracking sensor 140 to track the aircraft's progress even when it might be off of the tail dock facility bay centerline. In a representative embodiment of the system, the wide angle beam pattern 142 may be produced through the use of a cylindrical lens and exhibit a divergence of substantially five degrees (5°) subject to the requirements of a particular facility and aircraft type.

As a practical matter, it is desirable to have the cleanest wiring from the lateral alignment and backup tracking sensors 116, 118 (FIG. 3) to the PLC 120. For this reason, 100 foot length Turck™ data cables between the sensors 116, 118 and the PLC 120 cabinet may be employed. Each data cable will terminate at the PLC 120 cabinet with power and ground going to a DIN (Deutsches Institut für Normung) rail mounted direct current (DC) power supply and the common ground and transmit (TX) and receive (RX) signals going to a terminal block RS-232 to Ethernet converter. If used, each RJ45 connector cable may be routed to an Ethernet switch and be coupled to the PLC 120 via an Ethernet line.

The PLC 120 cabinet may comprise a DIN rail mounted PLC as such are modularly expandable with a WiFi module also coupled to the Ethernet switch. In a representative embodiment, the WiFi service set identifier (SSID) may be permanently set to the associated tail dock facility bay number and the PLC 120 can directly drive the horn and lights at the panel via discrete outputs to a relay module.

In operation, each bay of a tail dock facilities may have its own WiFi module to remain independent of the hangar's wireless network. The WiFi module at the panel can send out three (3) centerline offsets, one backup tracking distance and warning/stop conditions as determined by the PLC 120. The app in the associated tablet device may also be used to initiate system startup self-tests while the pre-insertion checklist is being completed. The app may also communicate the aircraft 102 profile data to the PLC 120 to ensure there is a proper height backup tracking sensor 118 (FIG. 3) plus all warning tolerance information.

The tug 108 mobile module is desirably configured to receive data from the PLC 120 panel's WiFi module and based upon any stop/warning conditions received, the module will activate warning horns and lights. This module can be dedicated to the specific bay with WiFi warnings being preset. In a representative embodiment, this module may have a magnetic mount so as to be capable of being placed on any given tug 108 and not requiring a particular fixed installation. In practice, this module may reside in the hangar office attached to a wall charger to ensure it is ready for use at any time.

With respect to the ruggedized tablet and associated app utilized by the principal guide 110, this device may be, for example, an Android tablet dedicated to a particular bay with the WiFi pairing being preset. In practice the app may lay out a procedure for the principal guide 110 to follow starting with a pre-insertion insertion checklist and then monitor the insertion's progress as the aircraft 102 approaches the tail dock. Given the change in distance to the stopping point as indicated by the backup tracking sensor(s) 118, the speed of the tug 108 may be displayed. Excessive speed can serve to prevent the ground crew from warning the tug 108 operator before an accident occurs with different speed zones possibly being delineated.

In a particular embodiment of the present invention, the principal guide 110 may also be provided with a manual override to effect a full stop of the insertion process at any time. When the aircraft 102 is correctly docked, the principal guide 110 may be provided with a "Docking Complete" indication in the tablet app with the app then generating a PDF (portable document format) report with all relevant information, pictures of the pre-insertion locations and a position vs. time graph which might further be utilized to evaluate the aircraft 102 insertion team.

While there have been described above the principles of the present invention in conjunction with specific systems, apparatus and methods it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A tail dock anti-collision system for augmenting positioning of an aircraft in a maintenance facility comprising:
    a plurality of lateral alignment sensors disposed on opposing sides of said aircraft;
    at least one backup tracking sensor directed toward a tail section of said aircraft; and
    a processor in operative association with said plurality of lateral alignment and backup tracking sensors for providing an indication to a principal guide of said aircraft into said tail dock of a relative position of said aircraft with respect to a centerline and platform of said maintenance facility.

2. The tail dock anti-collision system of claim 1 wherein said lateral alignment and backup tracking sensors comprise laser sensors.

3. The tail dock anti-collision system of claim 1 wherein said lateral alignment and backup tracking sensors are affixed to said platform of said maintenance facility.

4. The tail dock anti-collision system of claim 1 further comprising extension bars coupled to said platform of said maintenance facility to provide mounting positions for at least some of said lateral alignment sensors.

5. The tail dock anti-collision system of claim 1 wherein said backup tracking sensor emits a relatively wide angle beam patterns toward said tail section of said aircraft.

6. The tail dock anti-collision system of claim 5 wherein a target of said backup tracking sensor is an APU exhaust port of said aircraft.

7. The tail dock anti-collision system of claim 1 wherein said plurality of lateral alignment sensors further comprise corresponding target boards located on respectively opposite sides of said platform of said maintenance facility.

8. The tail dock anti-collision system of claim 1 wherein said processor comprises a WiFi system for communication of information with a tug inserting said aircraft into said tail dock.

9. The tail dock anti-collision system of claim 8 wherein said WiFi system is further operative for communication of information with said principal guide through a handheld tablet device.

10. The tail dock anti-collision system of claim 9 wherein said tablet device is operative in conjunction with an application program for communication of information between said principal guide and said processor in response to position data received from said lateral alignment and backup tracking sensors.

11. The tail dock anti-collision system of claim 8 wherein said processor is operative to provide one of at least visual or auditory warnings to an operator of said tug in response to a problem sensed in said relative position of said aircraft with respect to said centerline and platform of said maintenance facility.

* * * * *